Feb. 17, 1942.                F. C. STOCKWELL ET AL                 2,273,073
                                  ELECTROMAGNET
                              Filed Feb. 28, 1940                 2 Sheets-Sheet 1
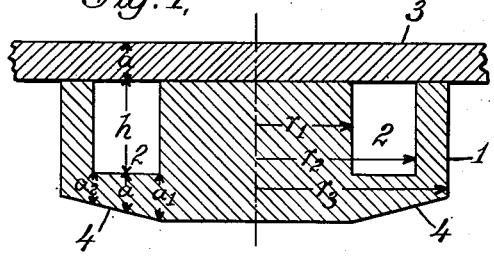
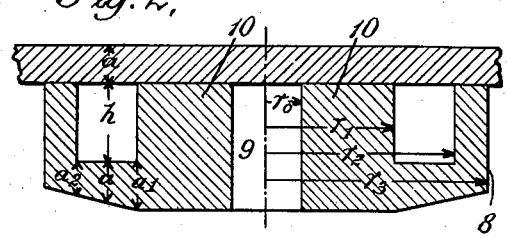
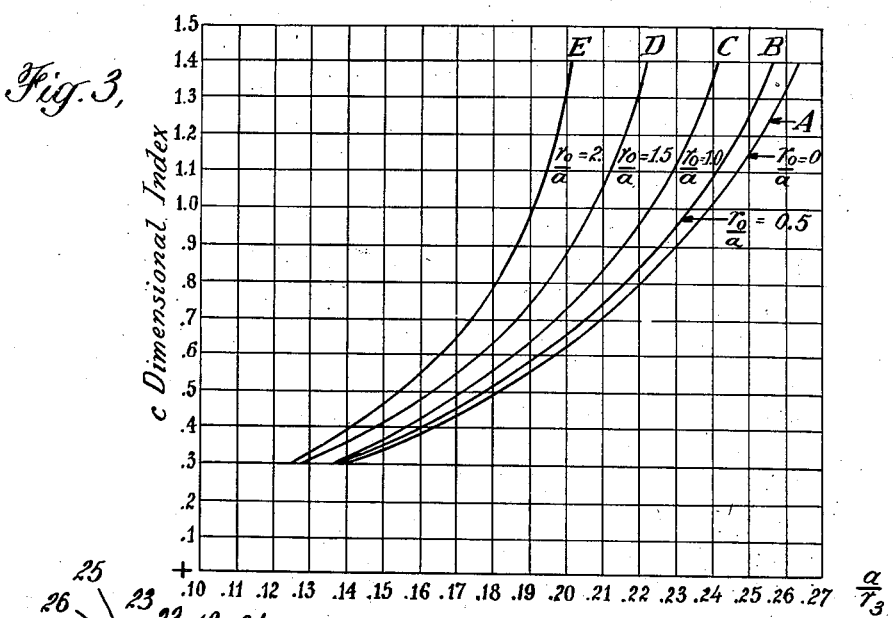
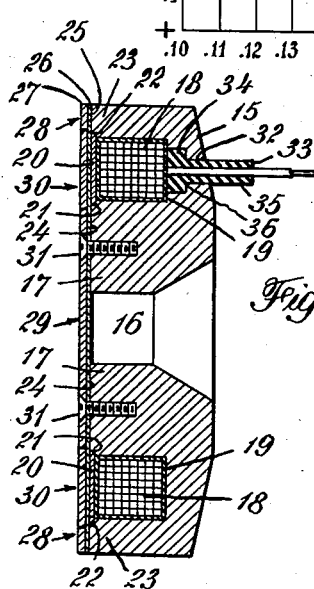
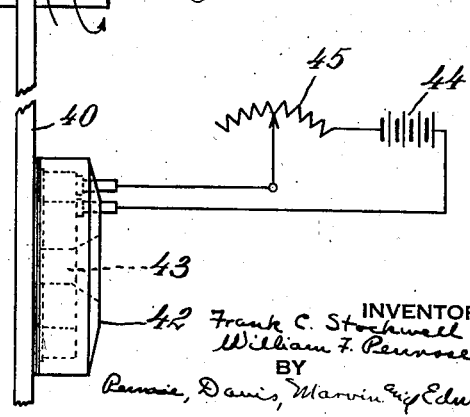
INVENTORS
Frank C. Stockwell and
William F. Penrose
BY
Pennie, Davis, Marvin & Edmonds
ATTORNEYS Feb. 17, 1942.   F. C. STOCKWELL ET AL   2,273,073
ELECTROMAGNET
Filed Feb. 28, 1940   2 Sheets-Sheet 2
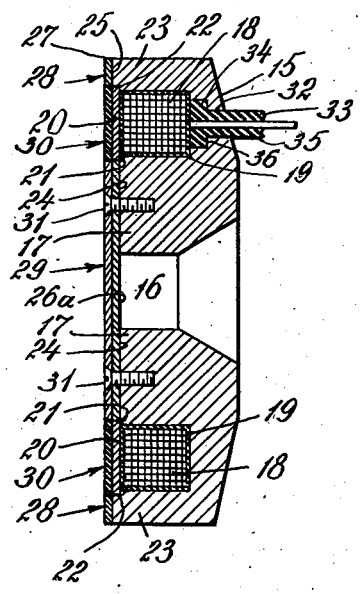

Patented Feb. 17, 1942

2,273,073

UNITED STATES PATENT OFFICE 2,273,073

ELECTROMAGNET

Frank C. Stockwell, Hoboken, and William F. Penrose, Irvington, N. J., assignors to Empire Electric Brake Corporation, a corporation of Delaware Application February 28, 1940, Serial No. 321,168

15 Claims. (Cl. 188—164)

This invention relates generally to an improved compact iron-clad flat-face central-core direct current electromagnet to be operated in sliding friction engagement with a rotating disc-like flat-face armature plate and particularly to such an electromagnet useful in combination with a lever in electromagnetically actuated brakes wherein the actuating mechanism including the electromagnet is subject to severe space limitations as, for example, the small free space between brake shoe assembly and axle within the drum of conventional automobile, truck, trailer, and motorcycle brake drums.

The invention has for its principal object to so proportion the dimensions of an iron-clad flat-face electromagnet structure or casing, including the yoke, the winding space, and the inner and outer cores, that within restrictions imposed by limitations of the space where the electromagnet is required to operate the most advantageous use is made of the materials employed in its structure.

To this end the determination of the critical dimensions is based upon a specified limiting value for the radius of the outer casing for various thicknesses of the armature plate. The criterion adopted is that the winding space is proportioned with respect to both the outside dimensions of the casing and to the yoke thickness at the center line of the winding space to provide substantially uniform area of magnetic path or substantially uniform flux density neglecting leakage, throughout the magnetic circuit.

We are aware that circular iron-clad central-core direct current lifting electromagnets of high efficiency have been proposed and constructed, for example, the so-called Hazeltine electromagnet described in the text "Electrical Engineering," The Macmillan Company, 1924, by Professor L. A. Hazeltine. But prior to the present invention compact iron-clad central-core electromagnets were not known or indicated in the art.

Among other objects of the invention are to provide a separate flat facing for the electromagnet which serves to cover the winding space with material having desirable friction characteristics and to provide coplanar flat magnetic material working pole faces over the inner and outer cores of the electromagnet casing contiguous the friction material. The facing is preferably so constructed of magnetic and non-magnetic wear resistant friction material as to permit of a high attractive force between electromagnet and armature and to assure a substantially constant coefficient of friction independent of relative motion between the electromagnet and its armature and of the magnetic attraction normal force between them. It is intended that the facing shall have a reasonably long life in use although it is designed to be subject to greater wear than the armature.

An important object of the invention is to provide the electromagnetic system, including the armature, with nicety of control of the magnetic force. This requires that the magnetic circuit shall, even at maximum current in the winding, be saturated only to a limited extent. The desired condition may be obtained by interposing a non-magnetic gap or gaps of predetermined thickness within the system. To assure that a gap shall remain of fixed and uniform thickness, it may conveniently be established by the use of thin non-magnetic sheet metal arranged within the electromagnet casing and facing at a plane not subject to wear, for example, at the back of the separate facing upon either or both the central and outer cores. The presence of a non-magnetic gap also serves the important function of destroying residual magnetization with the result that the frictional force falls to zero when the direct current voltage source is disconnected from the electromagnet winding.

Since it is desirable to avoid the production of moments tending to overturn the electromagnet when operating in flat rubbing contact relation with the moving armature, it has been proposed to apply the force derived between the electromagnet and armature from within the central core of the electromagnet at a plane closely adjacent the face of the electromagnet in sliding contact with the armature. Accordingly, we provide in our improved electromagnet circular casing a circular opening in the central core thereof preferably concentric the casing axis. In this way the electromagnet may be supported from within the central core closely adjacent the face thereof and substantially at or about the axis of symmetry.

The invention may be more fully understood by reference to the drawings and the following description. In the drawings:

Fig. 1 is a front view in schematic central vertical section showing the configuration of the electromagnet structure of the present invention with the inner and outer core pole faces in contact with a flat-face armature plate fragment;

Fig. 2 is a front view in schematic central vertical section of an electromagnet having an opening in the central core in accordance with a feature of the present invention;

Fig. 3 is a graph showing a series of curves relating to Figs. 1 and 2;

Fig. 4 is a front view in vertical section at a diameter of an electromagnet casing having a separate facing and provided with a non-magnetic gap of uniform fixed thickness, all in accordance with the present invention;

Fig. 5 is a side view showing the electromagnet in operative sliding friction engagement with a rotating disc-like armature plate and with the electromagnet winding connected with means including a source of voltage for controllably energizing the electromagnet.

Fig. 6 is a front view in vertical section of a modification of Fig. 5, wherein the interposed non-magnetic gap of non-magnetic material is wholly disposed in the magnetic path within the central core.

Referring now to Fig. 1, the various dimensions of the circular iron-clad central-core electromagnet casing 1, are indicated by reference letters as follows: $a$ equals yoke thickness at the center line of the annular winding space 2, and also the thickness of the armature plate 3. The depth of the winding space 2, is indicated by $h$. The radius of the central inner core is indicated by $r_1$, the inner radius of the outer core by $r_2$, and the outer radius by $r_3$. The yoke thicknesses at the chamfered portions 4, at the back of the casing 1, are indicated by $a_1$ and $a_2$, respectively.

The criterion adopted in accordance with the invention is that the winding space is proportioned with respect both to the outside dimensions of the casing and to the yoke thickness at the center line of the annular winding space to provide substantially uniform area of magnetic path.

Thus
$$S = \pi r_1^2 = \pi(r_3^2 - r_2^2) = \pi a(r_1 + r_2) \quad (1)$$

wherein $S$ is the area of the magnetic path. The following should also obtain $$2\pi r_2 a_2 = 2\pi r_1 a_1 = \pi a(r_1 + r_2)$$

Let
$$c = \frac{a}{r_2 - r_1}$$

be designated the "dimensional index" (2)

Then from
$\pi r_1^2 = \pi a(r_1 + r_2)$ and (2), $$r_1 = a\left(1 + \sqrt{1 + \frac{1}{c}}\right) \quad (3)$$

From
$$r_2 = r_1 + (r_2 - r_1) = r_1 + \frac{a}{c},$$

$$r_2 = r_1\sqrt{1 + \frac{1}{c}} \quad (4)$$

From
$\pi r_1^2 = \pi(r_3^2 - r_2^2)$ and (4), $$r_1 = \frac{r_3}{\sqrt{2 + \frac{1}{c}}} \quad (5)$$

From (3) and (5)

$$\frac{r_3}{a} = \sqrt{2 + \frac{1}{c}} + \sqrt{2 + \frac{3}{c} + \frac{1}{c^2}} \quad (6)$$

If the outer radius $r_3$ is specified, then, for any chosen value of armature plate thickness $a$, the dimensional index $c$ may be computed from Equation 6 and thus the dimensions $r_1$ and $r_2$ determined. The evaluation of $c$ is preferably made from a graph where for each of several values of $c$ above and below unity corresponding values of $$\frac{r_3}{a} \text{ or } \frac{a}{r_3}$$

are computed and plotted. For example, let $c=1.0$ then $$\frac{r_3}{a} = 4.18 \text{ and } \frac{a}{r_3} = .239$$

and similarly for other values of $c$. The graph of $c$ versus $$\frac{a}{r_3}$$

for a circular flat-face armature, direct current electromagnet with solid central core as in Fig. 1 is shown as curve A in Fig. 3.

One of the space limitations controlling the proportioning of the electromagnet in accordance with the invention is the available over-all axial thickness of casing plus armature plate thickness, i. e. the dimension $h+2a$. We have found that the depth of winding space $h$ is preferably related to the parameters $a$ yoke or armature plate thickness and $c$ dimensional index as follows:

$$h = \frac{a}{c}$$

To accommodate the desired coil winding and also to keep within specified temperature limitations, $h$ may, if required, be increased slightly over the value determined by the above relationship.

In Fig. 2 the various dimensions of the electromagnet casing 8 corresponding to those of Fig. 1 are indicated by the same reference letters. Since the casing 8 is provided with an axial circular opening 9, in the central core 10, the radius thereof is indicated by $r_0$. The values of $r_0$ and $r_3$ are specified, then similarly to the development of the equations relating to Fig. 1.

$$S = \pi(r_1^2 - r_0^2) = \pi(r_3^2 - r_2^2) = \pi a(r_1 + r_2) \quad (7)$$

From
$\pi(r_1^2 - r_0^2) = \pi a(r_1 + r_2)$ and the "dimensional index" Equation 2 above $$r_1 = a\left(1 + \sqrt{1 + \frac{1}{c} + \frac{r_0^2}{a^2}}\right) \quad (8)$$

or
$$r_1 = ak \quad (9)$$

where
$$k = 1 + \sqrt{1 + \frac{1}{c} + \frac{r_0^2}{a^2}} \quad (10)$$

From
$$r_2 = r_1 + (r_2 - r_1) = r_1 + \frac{a}{c} \text{ and (9)}$$

$$r_2 = r_1\left(\frac{1+ck}{ck}\right) \quad (11)$$

From (7) and (2),
$$r_3^2 - r_2^2 = a(r_1 + r_2) = c(r_2^2 - r_1^2)$$

whence using (9) and (11)

$$r_1 = r_3\left[(c+1)\left(\frac{1+ck}{ck}\right)^2 - c\right]^{-\frac{1}{2}} \quad (12)$$

From (9) and (12)

$$\frac{r_3}{a} = k\left[(c+1)\left(\frac{1+ck}{ck}\right)^2 - c\right]^{\frac{1}{2}} \quad (13)$$

The dimensional index $c$ of Equation 13 is preferably evaluated for specified values of $r_3$ and $r_0$ and for a series of values of $a$ from a graph containing a family of curves of $c$ versus $$\frac{a}{r_3}$$

with values of $$\frac{r_0}{a}$$

as parameters. For example, let $c=1.0$ and $$\frac{r_0}{a}=0.5$$

then $k=2.50$, and $$\frac{r_3}{a}=4.27$$

or $$\frac{a}{r_3}=0.234$$

The graph based upon Equation 13 is shown in Fig. 3 in curves B to E inclusive.

The proportion of the dimensions of the electromagnet casing in accordance with the invention, for example as schematically shown in Figs. 1 and 2, as determined by the dimensional index $c$ is independent of the kind of ferromagnetic material used or of the desired magnetic force to be exerted. To obtain a desired force when operated at a specified voltage, suitable ferromagnetic material must be chosen, the higher the desired force, the better must be the quality or permeability of the material or the more highly must the material be saturated.

In Fig. 4 the circular cylindrical ferromagnetic casing 15 of the type of Fig. 2 having a circular opening 16, axially the circular central core 17, is provided with an annular winding 18, preferably of the pre-formed, insulated, and impregnated type. The winding 18 as preformed closely fits the annular winding space 19 and is firmly retained therein by a thin annular washer 20 of non-magnetic material, preferably brass, in press fit about the central core 17 on the annular shoulder 21 thereof and on the annular shoulder 22 of the outer core 23.

When the washer 20 is properly in place, the face of the casing 15 presents a substantially flat surface including the central and outer core faces 24 and 25 in coplanar relation. Over the circular flat surface presented by the central and outer core faces 24 and 25 and the washer 20, there is arranged a thin circular disc or shim 26 of non-magnetic material, preferably brass, for the purpose of interposing a fixed, non-magnetic gap or gaps of fixed uniform thickness sufficient to prevent substantial saturation of the magnetic circuit even at maximum current in the winding thereof and to destroy the tendency of residual magnetization. As an alternative, a thin shim 26a may be laid over but one of the core faces, for example, the central core as shown in Fig. 6, in which event it will be of the order of twice the thickness to interpose an equivalent non-magnetic gap to that provided by the shim 26 as described.

Upon the shim 26 and in full flat contact therewith is arranged a separate thin disc-like facing 27 having an annular outer portion 28 and an inner circular portion 29, both of the same ferromagnetic material, preferably of high permeability and of softer material than that of the armature plate to be used in conjunction with the electromagnet. Contiguous the annular outer and circular inner portions 28 and 29, there is provided an annulus of non-magnetic friction material 30, preferably of the kind used in hard brake linings and having a coefficient of friction of the order of 0.4.

It is to be noted that the members 28 and 29, are of smaller area than the face of the central and outer cores 17 and 23, for which the facing 27 provides coplanar pole faces. In this way, the magnetic attraction between the electromagnet and armature is increased when in operative flat contact relation.

The facing 27 and shim 26 may be affixed to the casing 15 by machine screws 31, extending into the central core 17, or in any other effective manner. When assembled with the casing 15, the separate facing 27 not only permits of a high attractive force between electromagnet and armature in flat contact but also by reason of the non-magnetic friction material annulus 30, tends to assure a substantially constant coefficient of friction, independent of relative motion between the electromagnet and armature and of the magnetic attraction normal force between them. It is intended that the facing 27, shall be wear resistant and have a reasonably long life in use although it is designed to be subject to greater wear than the armature employed with the electromagnet.

To provide electrical connection to the winding 18, two circular openings 32 are provided in the yoke at the back of the magnet providing apertures leading to the bottom of the winding space 19. To provide against the possibility of moisture being admitted through the openings 32, specially shaped soft rubber plug members 33 having a collar portion 34, and an elongated portion 35, depending therefrom, are fitted into the opening 32, at a countersunk portion 36, at the bottom of the winding space 19. The electrical leads from the winding 18, are led through the rubber members 33, as will be observed.

The ampere turns to be employed in the winding 18 at a given operating voltage may be determined from equations well known in the art, and the diameter of the wire employed in the winding will be determined largely by the allowable temperature rise due to coil heating.

In electromagnets constructed in accordance with the invention, like Fig. 4, and adapted to be energized from 6-volt storage batteries, satisfactory casings have been made of low carbon hot-rolled steels known in the trade as SAE1112 and X1113. A compact electromagnet particularly adapted for use in electromagnetically actuated motorcycle brakes has been constructed in accordance with the invention with an outside casing diameter of 1¾ inches and approximately ⅝ inch in over-all thickness including the facing and a 0.002 inch brass shim. In this electromagnet, No. 29 enameled wire is used in the winding and at 0.8 amperes the tangential force developed with its rotating armature is of the order of 30 pounds.

In a similar electromagnet for use in a conventional automobile ten-inch brake drum, the electromagnet casing is 2⅝ inches in outside diameter and approximately ⅞ inch in over-all thickness including the facing and a 0.003 inch brass shim. In this magnet, No. 23 enameled wire is used in the winding and at 2.0 amperes, the tangential force developed is of the order of 70 pounds.

The ferromagnetic material used for the outer and inner magnetic material portions of the facing is preferably of malleable iron, heat treated to increase its normal permeability. The thickness of the facing is largely determined by mechanical requirements and the amount of wear to be provided for.

In Fig. 5 the circular disc-like flat face armature plate 40 is adapted to rotate about its axis on the shaft 41. The electromagnet 42 of the type of Fig. 4, is wholly supported on a working member (not shown) from within the opening 43, in the central core closely adjacent the face thereof, and with its flat face in continuous rubbing contact relation with the flat face of the armature 40.

The winding of the electromagnet 42 is connected in circuit with a source of direct current voltage 44 and the rheostat 45. Upon manipulation of the rheostat 45 the electromagnet winding may be controllably energized from zero to any desired current value up to the maximum at the operating voltage. For each current value there is a corresponding normal magnetic force and tangential frictional force between the electromagnet and armature.

Where it may be desirable to fabricate the electromagnet casing by assembling parts thereof of two grades of iron having different magnetic properties respectively, the area of magnetic path in the iron of lower permeability should be increased in the ratio of the maximum normal permeabilities of the two grades of iron. Similarly, if the armature plate material has a different permeability than the casing yoke material, the thickness thereof should be different from that of the yoke thickness $a$ in the ratio of the maximum normal permeabilities of the two materials. For example, if the armature plate material has a lower permeability, its thickness should be greater than the yoke thickness $a$ in the ratio of the maximum normal permeabilities of the two materials.

It is to be understood that by use of the dimensional index $c$ and the development of equations similar to those of (1) to (13), the invention may be applied to electromagnets whose sections are not circular cylindrical in shape.

We claim:

1. A compact iron-clad central-core flat-face direct current electromagnet adapted to be operated in continuous relative movement sliding friction engagement with a flat-face armature plate, having a structure comprising, a circular cylindrical casing of ferromagnetic material providing a yoke and an annular winding space open at the face of the casing between concentric central and outer cores, the depth and radial width of said winding space being proportioned to provide a substantially uniform area of magnetic path in said casing, said proportioning being determined by both the outside diameter of said casing and the yoke thickness at the center line of the winding space, a non-magnetic gap of non-magnetic material interposed in the said magnetic path, and a separate working facing arranged over said non-magnetic material gap, said interposed gap being adapted to assure nicety of electromagnet control and to prevent substantial residual magnetic attraction between electromagnet and armature.

2. A compact iron-clad central-core flat-face direct current electromagnet adapted to be operated in continuous relative movement sliding friction engagement with a flat-face armature plate, having a structure comprising, a circular cylindrical casing of ferromagnetic material providing a yoke and an annular winding space open at the face of the casing between concentric central and outer cores, and having a circular opening throughout the said central core concentric the axis of the casing, the depth and radial width of said winding space being proportioned to provide a substantially uniform area of magnetic path in said casing, said proportioning being determined by the radius of the said opening in the central core and by both the outside diameter of said casing and the yoke thickness at the center line of the winding space, a non-magnetic gap of non-magnetic material interposed in the said magnetic path at said central core face, and a continuous circular separate facing of magnetic material arranged over said non-magnetic material in substantial parallel relation with said central core face to provide a working pole-face therefor, said interposed non-magnetic gap being adapted to assure nicety of electromagnet control and to prevent substantial residual magnetic attraction between electromagnet and armature.

3. A compact iron-clad central-core flat-face direct current electromagnet adapted to be operated in continuous relative movement sliding friction engagement with a flat-face armature plate, having a structure comprising, a circular cylindrical casing of ferromagnetic material providing a yoke and an annular winding space open at the face of the casing between concentric central and outer cores, and having a circular opening in the central core extending therethrough concentric the axis from a substantial chamfer at the back of the casing to the face thereof, the depth and radial width of said winding space being proportioned to provide a substantially uniform area of magnetic path in said casing, said proportioning being determined by the radius of the said opening in the central core and by both the outside diameter of said casing and the yoke thickness at the center line of the winding space, a non-magnetic gap of non-magnetic material interposed in the said magnetic path, and a separate working facing arranged over said non-magnetic material, said interposed gap being adapted to assure nicety of electromagnet control and to prevent substantial residual magnetic attraction between electromagnet and armature.

4. A compact iron-clad central-core flat-face direct current electromagnet adapted to be operated in continuous relative movement sliding friction engagement with a flat-face armature plate comprising, a circular cylindrical casing of ferromagnetic material providing a yoke and an annular winding space open at the face of the casing between concentric central and outer cores, a winding arranged in said space, a non-magnetic gap of thin non-magnetic metal arranged over the said central core face, and a relatively thin disc-like circular facing member of non-metal friction and magnetic materials affixed to said casing over the face thereof, said facing member having a smooth flat working surface of predetermined overall coefficient of friction characteristic and being adapted to provide coplanar working magnetic pole faces for said central and outer cores.

5. A compact iron-clad central-core flat-face direct current electromagnet adapted to be operated in continuous relative movement sliding friction engagement with a flat-face armature plate comprising, a circular cylindrical casing of ferromagnetic material providing a yoke and an annular winding space open at the face of the casing between concentric central and outer cores, a winding arranged in said space and a relatively thin disc-like circular facing member of non-metal friction and magnetic materials affixed to said casing over the face thereof, said facing member having a smooth flat working surface of predetermined overall coefficient of friction characteristic and being adapted to provide coplanar working magnetic pole faces for said central and outer cores, and non-magnetic material of predetermined fixed thickness interposed in the magnetic path within said casing and facing.

6. A compact iron-clad central-core flat-face direct current electromagnet adapted to be operated in continuous relative movement sliding friction engagement with a flat-face armature plate, having a structure comprising, a circular cylindrical casing of ferromagnetic material providing a yoke and an annular winding space open at the face of the casing between concentric central and outer cores, said central core having a circular opening therethrough concentric the axis of the casing, a non-magnetic gap of thin non-magnetic metal arranged over the said central core face, and a relatively thin circular disc-like facing member of non-metal friction and magnetic materials affixed to said casing over the face thereof, said facing member providing a cover over said circular opening and coplanar working magnetic pole faces for said central and outer cores, and having the characteristic in flat rubbing contact with the armature of assuring a substantially constant coefficient of friction independent of the rate of relative motion between the electromagnet and armature and of the magnetic attraction normal force therebetween.

7. A compact iron-clad central-core flat-face direct current electromagnet adapted to be operated in continuous relative movement sliding friction engagement with a flat-face armature plate comprising, a circular cylindrical casing of ferromagnetic material providing a yoke and an annular winding space open at the face of the casing between concentric central and outer cores, a preformed winding arranged in said space, a thin annulus of non-magnetic material arranged over said winding within said winding space and adapted to present a substantially flat surface contiguous said core faces, and a relatively thin circular disc-like facing member of non-metal friction and magnetic materials affixed to said casing over the face thereof, said facing member providing a cover for said annulus and coplanar working magnetic pole faces for said central and outer cores and having the characteristic in flat rubbing contact relation with the armature of assuring a substantially constant coefficient of friction independent of the rate of relative motion between the electromagnet and armature and the magnetic attraction normal force therebetween.

8. A compact iron-clad central-core flat-face direct current electromagnet adapted to be operated in continuous relative movement sliding friction engagement with a flat-face armature plate comprising, a circular cylindrical casing of ferromagnetic material providing a yoke and an annular winding space open at the face of the casing between concentric central and outer cores, a winding arranged in said space, said central core having a circular opening therethrough concentric the axis of the casing, a non-magnetic gap of thin non-magnetic metal arranged over the said central core face, and a relatively thin circular disc-like facing member having alternate concentric annular segments of non-metal friction and magnetic materials affixed to said casing over the face thereof, said facing member providing a cover for said circular opening and coplanar working magnetic pole faces for said central and outer cores and having the characteristic in flat rubbing contact with the armature of assuring a substantially constant coefficient of friction independent of the rate of relative motion between the electromagnet and armature and of the magnetic attraction normal force therebetween.

9. A compact iron-clad central-core flat-face direct current electromagnet adapted to be operated in continuous relative movement sliding friction engagement with a flat-face armature plate, having a structure comprising, a circular cylindrical casing of ferromagnetic material providing a yoke and an annular winding space open at the face of the casing between concentric central and outer cores, a relatively thin circular disc-like facing member of non-metal friction and magnetic materials affixed to said casing over the face thereof, said facing member providing coplanar working magnetic pole faces for said central and outer cores, and a thin sheet of non-magnetic material of uniform thickness interposed between at least one of said core faces and the underside of said facing, said interposed non-magnetic material being adapted to establish a non-magnetic gap of predetermined fixed thickness in the magnetic path within said casing and facing.

10. In combination, a compact iron-clad central-core flat-face direct current electromagnet in continuous relative movement sliding friction engagement with a rotating disc-like flat-face armature, said electromagnet structure comprising a cylindrical casing of ferromagnetic material providing a yoke and a winding space open at the face of the casing between a central and an outer core, a relatively thin disc-like facing affixed to said casing over the face thereof providing coplanar working pole faces for said cores, and a thin sheet of non-magnetic material of uniform thickness interposed between at least one of said cores and the underside of said facing, said interposed non-magnetic material being adapted to establish a fixed non-magnetic gap of predetermined thickness assuring nicety of electromagnet control and to prevent substantial residual magnetic attraction between electromagnet and armature.

11. In combination, a flat-face electromagnet and a flat-face armature plate having working faces in continuous relative movement sliding friction engagement, a non-magnetic gap of thin non-magnetic material interposed in the magnetic path of said electromagnet, said electromagnet including a separate working facing arranged over said non-magnetic gap, said non-magnetic gap being disposed in non-contacting relation with both said electromagnet and armature working faces.

12. A flat-face electromagnet adapted to be operated in continuous relative movement sliding friction engagement with a flat-face armature plate and having a non-magnetic gap of non-magnetic material interposed in the magnetic path within the electromagnet structure in substantial parallel non-contacting relation with the working pole-faces thereof.

13. A flat-face electromagnet adapted to be operated in continuous relative movement sliding friction engagement with a flat-face armature plate and having a non-magnetic gap of non-magnetic material interposed in the magnetic path within the electromagnet structure in non-contacting relation with the working faces thereof, said interposed gap being adapted to assure nicety of electromagnet control and to prevent substantial residual magnetic attraction between electromagnet and armature.

14. In combination, a compact iron-clad central-core flat-face electromagnet in continuous relative movement sliding friction engagement with a flat-face armature plate, a non-magnetic gap of thin non-magnetic material interposed in the magnetic path within the central core thereof in non-contacting relation with the central working pole-face, said interposed gap being adapted to assure nicety of electromagnet control and to prevent substantial residual magnetic attraction between electromagnet and armature.

15. In combination, a flat-face electromagnet and a flat-face armature plate having working faces adapted to be operated in continuous relative movement sliding friction engagement, a non-magnetic gap of non-magnetic metal interposed in the magnetic path of said electromagnet, said electromagnet including a separate working facing arranged over said non-magnetic metal gap, said non-magnetic metal gap being arranged in substantially parallel non-contacting relation with said electromagnet and armature working faces.

FRANK C. STOCKWELL.
WILLIAM F. PENROSE.